Dec. 22, 1936. T. L. ROBINSON 2,065,475
ROLLER BEARING
Filed July 11, 1934
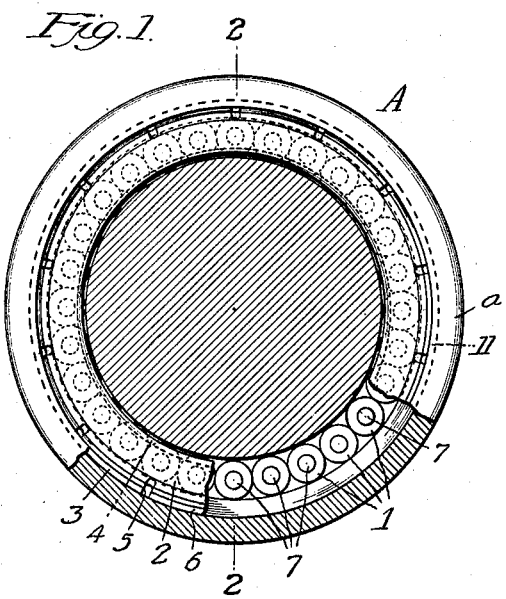
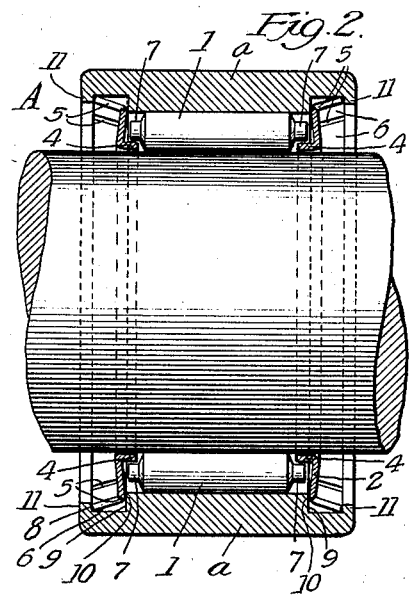
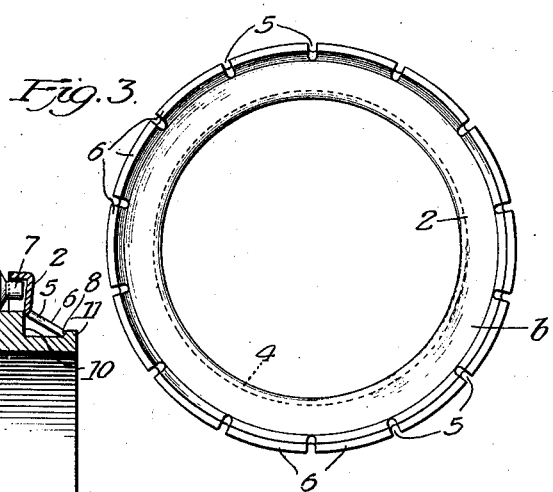
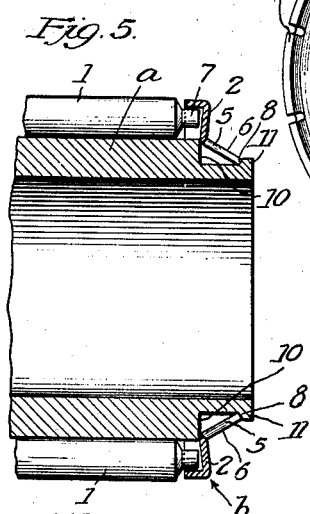
Inventor
Thomas L. Robinson
By Geo. E. Waldo, Atty.
Witness
Martin H. Olsen Patented Dec. 22, 1936

2,065,475

UNITED STATES PATENT OFFICE 2,065,475

ROLLER BEARING

Thomas L. Robinson, Valparaiso, Ind., assignor to McGill Manufacturing Company, Valparaiso, Ind., a corporation of Indiana Application July 11, 1934, Serial No. 734,594

9 Claims. (Cl. 308—212)

This invention relates to anti-friction bearings, and relates particularly to roller bearings of the general type which forms the subject-matter of my pending application, filed April 27, 1934, and numbered serially 722,713.

A principal object of the invention is to provide an anti-friction bearing of the general type specified, of new and novel construction, which is of relatively small diameter and which may be installed in relatively small space, as compared with usual types or forms of roller bearings now in general use.

In accordance with the invention, I attain the objects thereof by employing only one bearing member and mounting the anti-friction rollers thereon by suitable retaining means constructed and arranged for supporting the anti-friction rollers in operative engagement with the bearing surface on said bearing member.

A further object of the invention is to provide a new and novel retainer for thus mounting said anti-friction rollers on either the inner or the outer cylindrical bearing surface of the bearing member, as the case may be.

To effect the foregoing objects, a retainer embodying my invention and improvements comprises the various features, combinations of features and details of construction hereinafter described and claimed.

In the accompanying drawing, in which the invention is fully illustrated,

Figure 1 is an end view of a roller bearing, from either side of Fig. 2, with parts broken away to show covered parts and the anti-friction rollers mounted on the inner cylindrical surface of the bearing member;

Figure 2 is a view of the bearing shown in Fig. 1, from either side thereof, showing the bearing proper in section on the line 2—2 of Fig. 1, and a member mounted by means of said bearing, in side view.

Figure 3 is a detached view of my improved retainer for mounting the anti-friction rollers in operative engagement or relation with or upon the bearing member, looking into the dished side thereof.

Figure 4 is an enlarged, fragmentary sectional elevation of my improved retainer; and, Figure 5 is a view substantially similar to Fig. 3, but showing the anti-friction rollers mounted on the outer bearing surface of the bearing member.

Describing the invention with reference to the drawing, an anti-friction bearing embodying my invention and improvements, which for purposes of convenient reference is designated as a whole A, comprises a single bearing member designated in all figures, where shown, a, rotatably mounted on one surface only of which are anti-friction rollers designated in all figures, where shown, by the numeral 1, and which, as shown, form a continuous series extending entirely around the surface of the bearing member to which they are applied, with adjacent rollers free to contact with one another. As regards their usual features and excepting as hereinafter may be particularly described and pointed out, the bearing member $a$ and rollers 1 may be of any usual or desired construction and will readily be understood by persons familiar with such structures, from the drawing without a description thereof in detail.

In accordance with the invention, the rollers 1 are mounted on the bearing member $a$—either on its inner surface, as shown in Figs. 1 and 2, or on its outer surface, as shown in Fig. 5, by what may be referred to as retainers, designated as a whole, $b$, consisting, as shown, of rings 2 made of thin, resilient sheet metal, formed on the outer and inner edges of which, respectively, are flanges 3 and 4, which project at opposite sides of said rings—the flanges 3, as the bearing is assembled for use, projecting outwardly and the flanges 4 inwardly. As shown, also, the flanges 3 are dished and are provided at intervals with slots 5 to form separate resilient segments 6 to provide for flexure of said flanges without danger of permanent distortion. As shown, also, the flanges 4 form continuous, cylindrical treads which are concentric with the surface of the bearing member $a$, on which said anti-friction rollers are mounted in operation, the means for mounting said anti-friction rollers consisting of trunnions 7 formed on both ends thereof, with their axes of rotation and the axes of rotation of the rollers on which they are formed, respectively, coincident with each other, and the relation being such that when said anti-friction rollers are in operative contact with the surface of the bearing member with which they cooperate in use, said trunnions will be spaced slightly from the treads formed by said flanges 4 so that they will not "drag" thereon, and said flanges 4, being so positioned and proportioned that, as assembled for use with said rollers in contact with the surface of a bearing member in association with which they are mounted, said flanges 4 will enter between the surface of said bearing member to which the rollers 1 are applied in operation, when said rollers are mounted on the inner surface of the bearing member, as shown in Figs. 1 and 2, and the roller trunnions 7, but without contacting with either thereof.

Also, when the anti-friction rollers 1 are mounted on the outer surface of the bearing member $a$, as shown in Fig. 5, the flanges 4 are positioned and proportioned to enter between the trunnions 7 and a cylinder concentric with the bearing surface on the bearing member and tangent to the outer sides of the anti-friction rollers 1, when in contact with the bearing surface—and in spaced relation to both thereof.

In accordance with the invention, after the bearing has been assembled, in the manner and relation described, the retainers $b$ are adapted to be secured to opposite ends of the bearing member $a$ by interlocking the free ends of the resilient segments 6 of the flanges 3 thereof with circular shoulders 8 formed on portions of the bearing member $a$ which project outwardly beyond the ends of the bearing surface for the anti-friction rollers 1 on said bearing member, and with the faces of said rings $b$, intermediate the outer and inner flanges 3 and 4 thereon, overlapping and in contact with shoulders on said bearing member, as shown at 10, thereby not only securing the parts of the bearing together in operative relation, but also excluding dust and dirt from the bearing, and, to a large extent, preventing leakage of lubricant therefrom.

To effect engagement of the flange segments 6 with the shoulders 8, the diameter of the retainer rings at the outer edges of the marginal flanges 3, when unflexed, is sufficiently greater or less than the full diameter of the shoulders 8, as the case may be, that said flanges will be under flexure when forced through—or over—the collars 11 on which the shoulders 8 are formed—as said shoulders are interior or exterior shoulders—the resilience of said segments causing the ends thereof to interlock with said shoulders, after passing the collars 11, as readily will be understood.

Specifically, in the bearing shown in Figs. 1 and 2, the anti-friction rollers 1 are mounted on the inner cylindrical surface of the bearing member $a$, and the various parts are particularly designed and constructed for use in this relation.

However, within the scope and contemplation of the invention, the anti-friction rollers 1, to meet different conditions may equally well be mounted on the exterior surface of the bearing member. This change or adaptation involves no change in principle from the construction shown in Figs. 1 and 2 and heretofore described, and, it is believed, will readily be understood from an examination of the drawing (see Fig. 5) without a separate description thereof in detail.

As further showing the substantial identity of the bearing shown in Fig. 5 with that shown in Figs. 1 and 2, the same and corresponding parts are designated by the same reference characters in all figures in which they are shown.

I claim:

1. A roller bearing comprising only a single bearing member provided with a cylindrical bearing surface, the axial dimensions of said bearing member being greater than that of the bearing surface thereon, said bearing member being provided with annular grooves arranged outside of and at opposite ends of the bearing surface thereon, each of which defines a pair of opposed shoulders, comprising a relatively high radially disposed shoulder at each end of the bearing on said member, and which define the length of said bearing surface, and a relatively much lower shoulder outside thereof and spaced therefrom, anti-friction rollers and means which cooperate with the shoulders defined by the annular grooves formed at the ends thereof for rotatably mounting said rollers on said single bearing surface of the bearing member, in which the means for mounting the rollers on the bearing surface of the bearing member consists of retainer rings made of thin resilient sheet metal, flanges formed on opposite edges of said retainer rings and which project at opposite sides thereof, comprising dished flanges provided with spaced slots to form separate resilient segments, constructed and arranged to interlock with the relatively low and axially remote shoulders on the bearing member, and continuous circular flanges arranged, respectively, to extend over trunnions formed on opposite ends of the anti-friction rollers and to support said rollers in operative relation to the bearing surface on the bearing member.

2. A roller bearing comprising only a single bearing member provided with a cylindrical bearing surface, the axial dimensions of said bearing member being greater than that of the bearing surface thereon, said bearing member being provided with annular grooves arranged outside of and at opposite ends of the bearing surface thereon, each of which defines a pair of opposed shoulders, comprising a relatively high radially disposed shoulder at each end of the bearing on said member, and which define the length of said bearing surface, and a relatively much lower shoulder outside thereof and spaced therefrom, anti-friction rollers and means which cooperate with the shoulders defined by the annular grooves formed at the ends thereof for rotatably mounting said rollers on said single bearing surface of the bearing member, in which the means for mounting the rollers on the bearing surface of the bearing member consists of retainer rings made of thin resilient sheet metal, flanges formed on opposite edges of said retainer rings and which project at opposite sides thereof, comprising dished flanges provided with spaced slots to form separate resilient segments, constructed and arranged to inter-lock with the relatively low and axially remote shoulders on the bearing member, and continuous circular flanges arranged, respectively, to extend over trunnions formed on opposite ends of the anti-friction rollers and to support said rollers in operative relation to the bearing surface on the bearing member, the relation being such that when the dished flanges are interlocked with said axially remote shoulders, the relatively flat sides of the retainer rings will rest in contact with the radial shoulders formed at opposite ends of the cylindrical bearing surface on the bearing member.

3. A roller bearing comprising only a single bearing member provided with a cylindrical bearing surface, the axial dimensions of said bearing member being greater than that of the bearing surface thereon, said bearing member being provided with annular grooves arranged outside of and at opposite ends of the bearing surface thereon, each of which defines a pair of opposed shoulders, comprising a relatively high radially disposed shoulder at each end of the bearing on said member, and which define the length of said bearing surface, and a relatively much lower shoulder outside thereof and spaced therefrom, anti-friction rollers and means which cooperate with the shoulders defined by the annular grooves formed at the ends thereof for rotatably mounting said rollers on said single bearing surface of the bearing member, in which the means for mounting the rollers on the bearing surface of the bearing member consists of retainer rings made of thin resilient sheet metal, flanges formed on opposite edges of said retainer rings and which project at opposite sides thereof, comprising dished flanges provided with spaced slots to form separate resilient segments, constructed and arranged to inter-lock with the relatively low and axially remote shoulders on the bearing member, and continuous circular flanges arranged, respectively, to extend over trunnions formed on opposite ends of the anti-friction rollers and to support said rollers in operative relation to the bearing surface on the bearing member, in which, as installed for use, the webs of the retainer rings at opposite ends of the bearing surface are slightly dished and diverge radially from each other relative to their respective lines on contact with the shoulders at the ends of the roller bearing.

4. The roller bearing specified in claim 1, in which the bearing surface on which the anti-friction rollers are mounted, is formed on the inner side of the bearing member.

5. The roller bearing specified in claim 1, in which the bearing surface on which the anti-friction rollers are mounted, is formed on the outer side of the bearing member.

6. The roller bearing specified in claim 2, in which the bearing surface on which the anti-friction rollers are mounted, is formed on the inner side of the bearing member.

7. The roller bearing specified in claim 2, in which the bearing surface on which the anti-friction rollers are mounted, is formed on the outer side of the bearing member.

8. The roller bearing specified in claim 3, in which the bearing surface on which the anti-friction rollers are mounted, is formed on the inner side of the bearing member.

9. The roller bearing specified in claim 3, in which the bearing surface on which the anti-friction rollers are mounted, is formed on the outer side of the bearing member.

THOMAS L. ROBINSON.